(12) United States Patent
Bortoli et al.

(10) Patent No.: US 8,096,791 B2
(45) Date of Patent: Jan. 17, 2012

(54) SUCTION VALVE FOR A SMALL HERMETIC COMPRESSOR

(75) Inventors: Marcos Giovani Dropa Bortoli, Joinville-SC (BR); Fabricio Caldeira Possamai, Costa e Silva-Joinville-SC (BR); Dietmar Erich Bernhard Lilie, Joinville (BR); Marcio Luiz Todescat, Joinville-SC (BR)

(73) Assignee: Whirlpool S.A., Sao Paulo-Sp (BR)

( * ) Notice: Subject to any disclaimer, the term of this patent is extended or adjusted under 35 U.S.C. 154(b) by 135 days.

(21) Appl. No.: 10/530,077

(22) PCT Filed: Aug. 8, 2003

(86) PCT No.: PCT/BR03/00145
§ 371 (c)(1),
(2), (4) Date: Sep. 22, 2005

(87) PCT Pub. No.: WO2004/033907
PCT Pub. Date: Apr. 22, 2004

(65) Prior Publication Data
US 2006/0096647 A1    May 11, 2006

(30) Foreign Application Priority Data

Oct. 9, 2002 (BR) .................................... 0204413

(51) Int. Cl.
*F04B 39/10* (2006.01)
(52) U.S. Cl. ........................ 417/571; 137/855
(58) Field of Classification Search .................. 417/571, 417/559, 569; 137/855, 856, 857, 858
See application file for complete search history.

(56) References Cited

U.S. PATENT DOCUMENTS

| | | | | |
|---|---|---|---|---|
| 2,859,912 A | * | 11/1958 | Swart et al. | 417/571 |
| 4,061,443 A | * | 12/1977 | Black et al. | 417/222.1 |
| 4,582,469 A | * | 4/1986 | Asaka et al. | 417/571 |
| 4,764,091 A | * | 8/1988 | Ikeda et al. | 417/269 |
| 5,197,867 A | * | 3/1993 | Kandpal | 417/571 |
| 5,266,016 A | * | 11/1993 | Kandpal | 417/569 |
| 5,328,338 A | * | 7/1994 | Hirano et al. | 417/312 |
| 6,099,275 A | * | 8/2000 | Fraser et al. | 417/569 |
| 6,823,891 B2 | * | 11/2004 | Schulze et al. | 137/512 |
| 2002/0141883 A1 | * | 10/2002 | Oofuchi | 417/269 |
| 2003/0068245 A1 | * | 4/2003 | MacBain et al. | 417/569 |

FOREIGN PATENT DOCUMENTS

| | | |
|---|---|---|
| DE | 1 093 629 | 11/1960 |
| DE | 1 600 739 | 7/1970 |
| GB | 1 336 676 | 11/1973 |
| WO | WO0198657 | * 12/2001 |

OTHER PUBLICATIONS

Authors: Joseph E. Shigley, Charles R. Mischke, Richard G. Budynas; Title: "Mechanical Engineering Design", Publisher: McGraw Hill 1963-2004, pp. 969-972.*

* cited by examiner

*Primary Examiner* — Devon C Kramer
*Assistant Examiner* — Dnyanesh Kasture
(74) *Attorney, Agent, or Firm* — Gifford, Krass, Sprinkle, Anderson & Citkowski, P.C.

(57) ABSTRACT

A suction valve for a small hermetic compressor formed as a flexible vane having a fixed end portion, a bending median portion and a sealing end portion with the distance between the external edge portion of the vane and an internal edge portion of the vane.

3 Claims, 3 Drawing Sheets

SUCTION VALVE FOR A SMALL HERMETIC COMPRESSOR

CROSS REFERENCE TO PRIOR APPLICATION

This is a U.S. national phase application under 35 U.S.C. §371 of International Patent Application No. PCT/BR2003/000145, filed Oct. 8, 2003, and claims benefit of Brazilian Patent Application No. PI 0204413-7, filed Oct. 9, 2002 which is incorporated by reference herein. The International Application was published in English on Apr. 22, 2004 as WO 2004/033907 A1 under PCT Article 21(2).

FIELD OF THE INVENTION

The present invention refers to a suction valve for a hermetic compressor of the type used in small refrigeration appliances, such as refrigerators, freezers, water-fountains, etc.

BACKGROUND OF THE INVENTION

The energetic efficiency of the small hermetic compressors of refrigeration is mostly attributed to the good performance of its valves in the control of the gas flow.

Compressors for domestic refrigeration appliances employ one-way valves that control the gas flow during operation. A suction valve controls the gas flow, which comes from the suction line connected to the low pressure side of the refrigeration system, and which is drawn through the compression cylinder, while a discharge valve controls the flow of the already compressed gas to be directed to the high pressure side of the refrigeration system.

The suction and discharge valves are usually formed by one or more gas passage orifices located in the valve plate, and by flexible vanes usually obtained from a thin steel plate and which are fixed by one of the ends thereof, so that when a pressure differential occurs through the valve the flexible vane is displaced, allowing the gas to pass in the preferred required direction.

Some design aspects should be considered in order to obtain an adequate operation with this type of valve, such as: area of the gas passage orifice; rigidity and natural frequency of the flexible vane and mounting characteristics with eventual acoustic filters.

Besides the operational characteristics, the reliability aspects should also be considered, which means to achieve an infinite life condition in relation to fatigue failure within the usual working ranges of the compressor. The main types of fatigue failure that occur in the flexible vane are: high bending stress in the region close to the valve fixation; high bending stress in the region over the gas passage orifice; high impact stress against the seat or against the stop.

The manufacture of the current valves takes into account the design restrictions, which fact, in a certain way, defines the working efficiency thereof. Such efficiency is strongly influenced by the degree of rigidity defined for the flexible vane.

There is a correlation between the rigidity of the flexible vane and the power that is consumed to carry out the suction or discharge processes, in which the higher the power the higher is the rigidity. Dynamic operational aspects of this component should be considered so that a reduction in the rigidity effectively results in an improvement in the performance of the compressor, in which the correct closing point of the valve must be achieved to avoid backflows.

Thus, a reduction in the rigidity of the flexible vane can improve the performance of the product, but results in higher flexibility of this movable component and, in determined working conditions, the amplitude of its displacement will eventually reach amplitudes to which the bending stress in the fixation region reaches prohibitive levels.

OBJECTS OF THE INVENTION

Thus, it is an object of the present invention to provide a suction valve for a small hermetic compressor, which presents a minimum rigidity without impairing its bending resistance.

It is a further object of the present invention to provide a suction valve as mentioned above, which allows obtaining a flexible vane from a sheet with a smaller thickness and which is more resistant to the bending fatigue.

It is still a further object of the present invention to provide a suction valve as described above, which results in an optimized balance between the reduction of the compression dead volume and the increase of resistance to the bending stresses, by providing an adequate peripheral finishing of the flexible vane.

SUMMARY OF THE INVENTION

These and other objects are achieved through a suction valve for a small hermetic compressor of the type presenting a compression cylinder that has an end closed by a valve plate.

The suction valve of the present invention comprises a flexible vane which is shaped so as to present: a fixation end portion to be affixed to the valve plate; a bending median portion provided with a median opening aligned with a discharge orifice in the valve plate; and a sealing end portion operatively associated with a suction orifice provided in the valve plate, the distance between an external edge of the flexible vane and its adjacent internal edge portion of the median opening progressively diminishing along a higher bending region of the of the valve, from a maximum value close to the fixation end portion, to a minimum value close to the boundary of the higher bending region of the valve.

BRIEF DESCRIPTION OF THE DRAWINGS

The invention will be described below, with reference to the attached drawings, in which.

DESCRIPTION OF THE ILLUSTRATED EMBODIMENT

Figure 1:
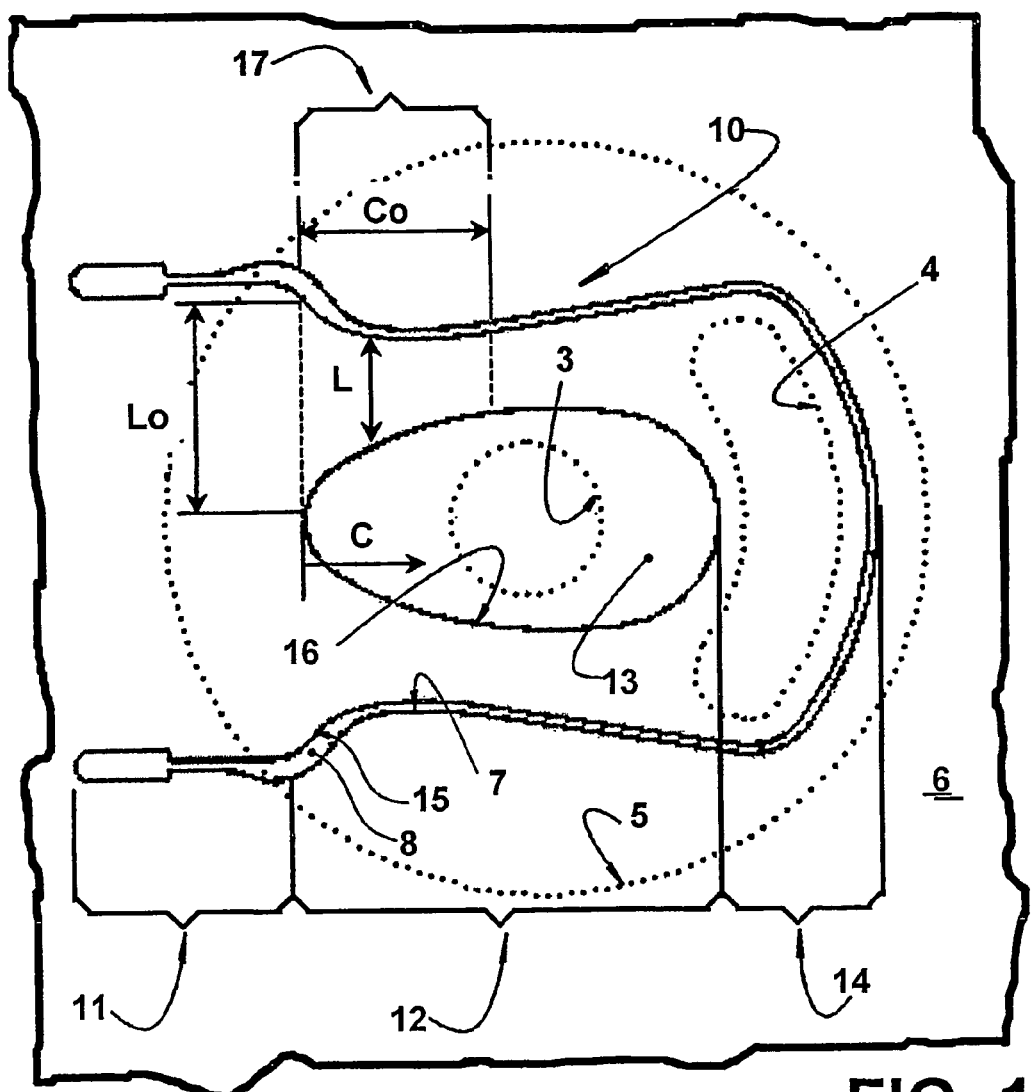
FIG. 1 illustrates, schematically, a plan view of a suction valve constructed according the present invention, when observed from the side of the compression cylinder that receives the valve plate, and indicating the suction and discharge orifices in the latter.
Figure 2:
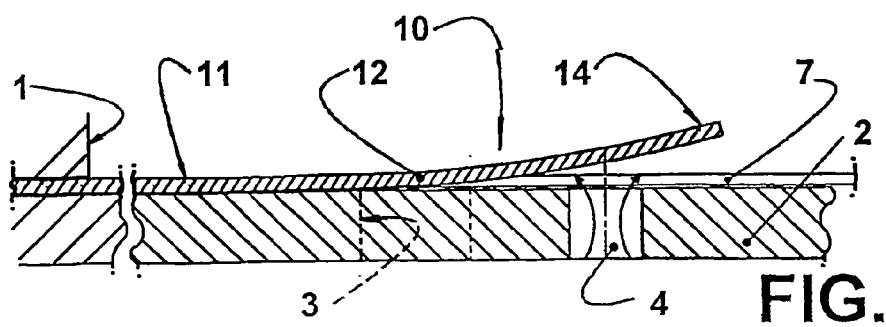
FIG. 2 illustrates, schematically, a partial longitudinal sectional view of a suction valve coupled to a valve plate and in an opening condition.

The present invention will be described in relation to a small hermetic compressor comprising, inside a non-illustrated shell, a motor-compressor assembly including a cylinder block defining a compression cylinder 1, inside which is lodged a reciprocating piston (not illustrated), drawing and compressing the refrigerant gas when driven by an electrical motor of the motor-compressor assembly. The compression cylinder 1 has an end closed by a valve plate 2, affixed to said cylinder block and which is provided with a discharge orifice 3 and at least one suction orifice 4 (only one is illustrated). Between the piston top and the valve plate 2 there is defined, inside the compression cylinder 1, a non-illustrated compression chamber. The cylinder block further carries a cylinder cover, not illustrated, which is affixed to the valve plate 2, in order to insulate the high pressure side from the low pressure side, and which defines, internally, suction and discharge chambers (not illustrated), which are respectively maintained in selective fluid communication with the compression chamber through the discharge orifice 3 and the suction orifice 4. This selective communication is defined by the opening and closing of suction and discharge valves, both in the form of a vane and each acting in the respective suction orifice 4 and discharge orifice 3.

According to the illustrations, the valve plate 2 presents the discharge orifice 3 substantially centralized in relation to an axial projection 5 of the internal contour of the compression cylinder 1, and a suction orifice 4 disposed internal to said axial projection 5 of the internal contour of the compression cylinder 1 and external to the contour of the discharge orifice 3.

In the illustrated construction, the discharge orifice 3 is circular and coaxial to the internal contour of the compression cylinder 1 and the suction orifice 4 is in the shape of an annular sector substantially concentric to at least one of the internal contours of the compression cylinder 1 and of the discharge orifice 3.

Figure 4:
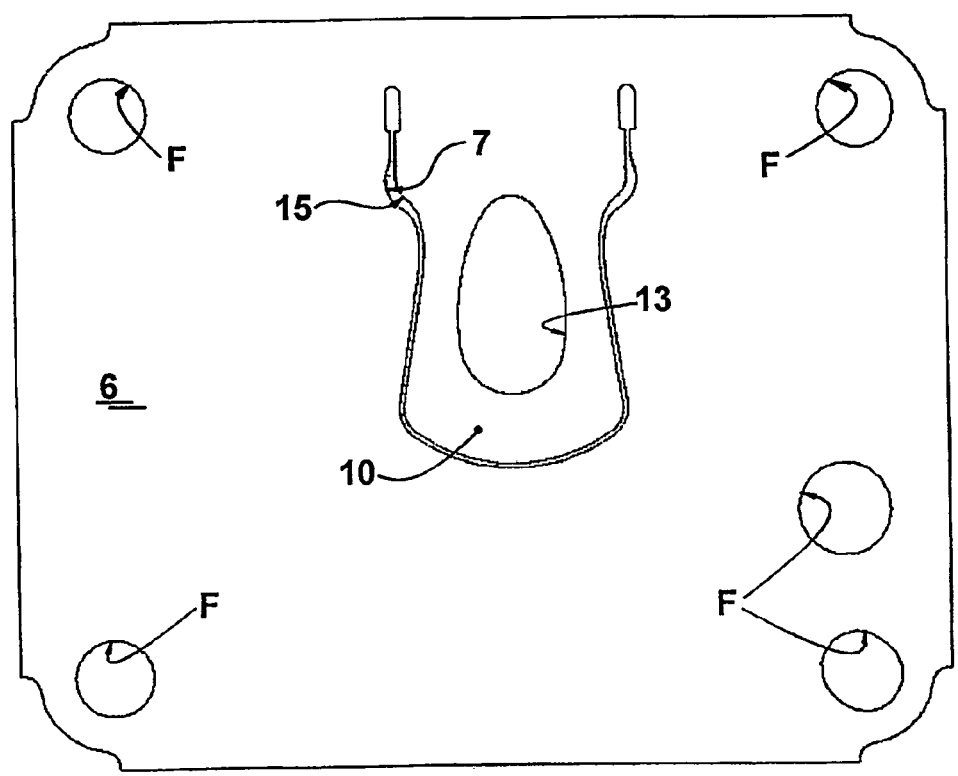
FIG. 4 illustrates, schematically, a plan view of a valve blade incorporating, by cutting, a flexible vane of the suction valve of the present invention.

The present invention will be described in relation to a suction valve for a small hermetic compressor, said valve being of the type comprising a flexible vane 10, which is stamped on a support blade 6, as illustrated in FIG. 4, said support blade 6 being defined in a material with appropriate characteristics for the operation of the flexible vane 10 during the opening and closing of the suction orifice 4 and being secured between the valve plate 2 and the cylinder head by appropriate means, for example those that secure said cylinder head to the valve plate 2 and to the cylinder block (non-illustrated). The support blade 6 is provided with holes F, which receive fixation means (not illustrated) to retain said support blade 6 between the cylinder head and the valve plate 2.

The flexible vane 10 is configured in a way to present: a fixation end portion 11, to be affixed to the valve plate 2; a bending median portion 12 provided with a median portion 13; and a sealing end portion 14, operatively associated with the suction orifice 4, said median opening 13 being aligned with the discharge orifice 3 in the valve plate 2 and imparting to the flexible vane 10, in its bending median portion 12 and in its sealing end portion 14, a "U" shape with the legs being united by the fixation end portion 11.

According to the invention, the vane 10 presents a determined geometry that is defined to result in a vane 10 with optimum relation between rigidity and maximum bending stress, as mentioned below.

The vane 10 of the present invention is defined in a sheet of flexible material and with reduced thickness, comprising an external edge 15 defining the external contour of the vane, for example substantially "U" shaped, and an internal edge 16, which defines the contour of the median opening 13.

According to the present invention, the distance between the external edge 15 of the flexible vane 10 and an adjacent portion of the internal edge 16 that defines the median opening 13 diminishes progressively along a higher bending region 17 of the vane 10, from a maximum value, close to the fixation end portion 11, to a minimum value, close to the boundary of the higher bending region 17.

In the present solution, the forces for opening the vane 10 are distributed along the higher bending region 17, which extends from the fixation end portion 11 to about 50%-60% the length of the flexible vane 10, preferably 55% said length, the maximum length of said region being indicated by the reference Co in FIG. 1.

The higher bending region 17 presents a width L that varies along the length thereof, the maximum being in the boundary region with the fixation end region 11. The maximum width of the bending region in indicated in FIG. 1 as Lo and varies according to the following mathematical relation: $L/Lo = ax4 + bx3 + cx2 + dx + 1$, where the a, b, c, and d coefficients are defined as a function of the rigidity and bending parameters of the support blade 6 and x is the ratio C/Co, where C is an extension of the higher bending region 17 measured from the boundary of the fixation end portion 11 and Co is the length of the higher bending region 17.

Figure 3:
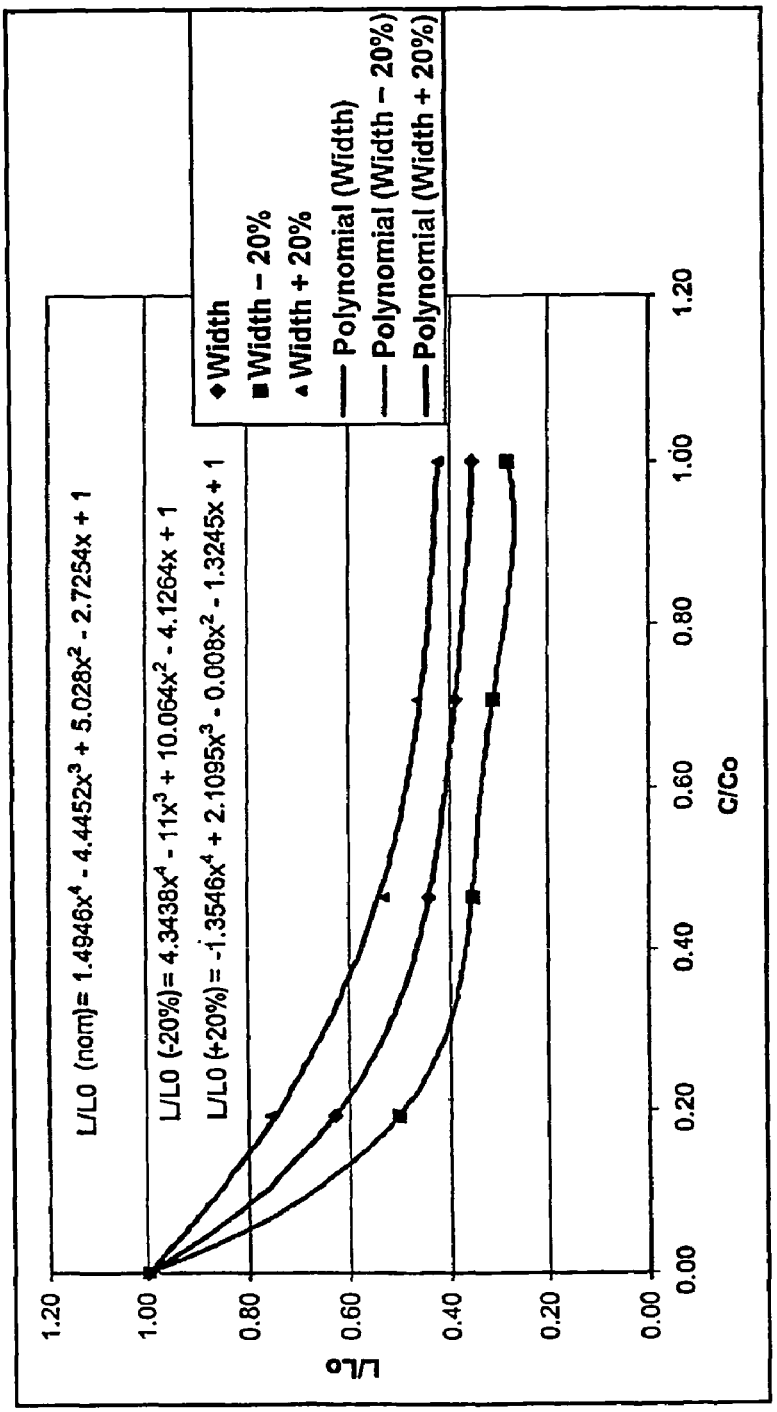
FIG. 3 illustrates, schematically, a graph showing a nominal curve of width variation of the flexible vane in its higher bending region, as a function of the length variation in this region, and two additional curves obtained from limit values of width and length of the bending region, according to the nominal curve presented.

According to the present invention, the distance between the external edge 15 and internal edge 16 of the vane 10 decreases more intensely close to the fixation end portion 11 than along the rest of the higher bending region 17, as it can be observed in FIG. 3 of the attached drawings, in which there is illustrated the curve L/Lo as a function of C/Co, obtained according the mathematical relation mentioned above and where the a, b, c, and d coefficients present the following values: 1,4946; −4,4452; 5,028; and −2,7254, respectively. The geometric shape of the flexible vane 10 is defined by the variation of the width L along the higher bending region 17 and as a function of the extension C in relation to the boundary line of the fixation end portion 11, according to the mathematical relation mentioned above, further accepting as adequate the values of width L presenting variations of plus or minus 20% in relation to the value obtained by said mathematical equation.

In the solution of the present invention, the width of the median opening 13 of the flexible vane 10 progressively increases from a region adjacent to the fixation end portion 11 to at least the opposite boundary of the higher bending region 17, whereas the total width of the flexible vane 10 diminishes from the fixation end portion 11, at an initial portion and, subsequently, it progressively increases towards the sealing end portion 14, from before the opposite boundary of the higher bending portion 17.

In the illustrated construction, the median opening 13 of the flexible vane 10 of the valve presents, along the higher bending region 17, a substantially semi-elliptic contour with its vertices being tangent with the fixation end portion 11, for example, a substantially oval contour, with the axis coinciding with the axis of the flexible vane 10 of the valve.

According to the present invention and as illustrated in the attached drawings, the flexible vane 10 is cut from the support blade 6, so as to have its external edge 15 spaced from an adjacent cutting edge 7 defined in the support blade 6, by a gap 8 having a larger width adjacent to the fixation end portion 1 of the flexible vane 10, facilitating the finishing of both the edge that contours the flexible vane 10 and the cutting edge 7 of the support blade 6 in this region and defining a minimum width around the rest of the flexible vane 10.

The finishing of the external edge 15 of the flexible vane 10 and of the cutting edge 7 of the support blade 6 is effected by tumbling and trimming, giving a rounded shape to said edges.

The smaller the gap 8 the harder to obtain a finishing of the external edge 15 of the vane 10 that results in a optimized balance between the reduction of the compression dead volume and the increase of the resistance to the bending stresses caused by the peripheral finishing of the flexible vane.

Thus, the gap 8 of the present invention is obtained so as to present a minimum value around the contour of the flexible vane 10, except in its region adjacent to the fixation end portion 11, where said gap 8 presents its higher value and allowing, in this region of higher forces, the flexible vane 10 to be better finished to increase its resistance to the bending stresses.

Due to the angular displacement of the sealing end portion 14 of the flexible vane 10, the tumbling of the external edge 15 thereof and of the adjacent cutting edge 7 of the support blade 6, along the sealing end portion 14 and the median portion 12 of the flexible vane 10, is more easily achieved than in the region adjacent to the fixation end portion 11 of said flexible vane 10, which allows a minimum gap 8 to be defined along the median portion 12 and the sealing end portion 14, which regions present the highest angular displacement of the flexible vane 10.

In the known prior art constructions, in the region of the flexible vane 10 adjacent to the fixation end portion 11 there is a lower deflection of said flexible vane 10, making it difficult to obtain the tumbling, which reduces the resistance of the flexible vane 10.

According to the present invention, the increase of the gap 8 adjacent to the fixation end portion 11 of the flexible vane 10 results in a better tumbling of the external edge 15 of the vane 10 and of the cutting edge 7 of the support blade 6 and, consequently, in an increase of the resistance to the bending stresses of the flexible vane 10 in this region.

The solution of the present invention allows designing a flexible vane with a rigidity which is considerably inferior to that of the conventional flexible vanes and which presents bending stresses in the fixation region equivalent to those of the component currently produced, but which are distributed along a region which is larger than that of the conventional vanes, usually concentrated in the region adjacent to the fixation end 11, resulting in better energetic performance of the hermetic compressor without reducing the reliability of the product as to the useful life thereof.

The present invention previously determines an optimum curve to define the contour of the flexible vane 10 and of its median opening 13, which allows reducing the maximum stress and better distributing the stresses in the critic bending regions of the flexible vane 10.

The invention claimed is:

1. A suction valve for a small hermetic compressor of the type presenting a compression cylinder, which has an end closed by a valve plate, said valve comprising:
a flexible vane comprising:
a fixation end portion to be affixed to the valve plate;
a bending median portion provided with a median opening aligned with a discharge orifice; and
a sealing end portion operatively associated with a suction orifice provided in the valve plate, the median and the sealing end portions of the flexible vane presenting the highest angular displacement thereof:
wherein a distance between an external edge of the flexible vane and its adjacent internal edge portion of the median opening diminishes more rapidly in a first portion of a higher bending region of the flexible vane close to the fixation end portion by way of a first curvature of the external edge and progressively in a second portion of the higher bending region of the flexible vane of the valve by way of a second curvature of the external edge from a maximum value, close to the end fixation portion, to a minimum value, close to the boundary of the higher bending region of the flexible vane,
wherein the flexible vane is configured to distribute opening forces along the higher bending region, allowing the flexible vane to be bent along the higher bending region in an opening position,
wherein the width of the median opening of the flexible vane increases, progressively, from a region adjacent to the fixation end portion to at least the opposite boundary of the higher bending region, whereas the total width of the flexible vane diminishes from the fixation end portion, at an initial portion, and then it begins to progressively increase towards the sealing end portion, from before the opposite boundary of the higher bending portion,
wherein the median opening of the flexible vane presents, an oval contour, and with the oval contour at its vertex being tangent with the fixation end portion: and
wherein the width (L) of the higher bending region is determined by the equation $L/Lo = ax^4 + bx^3 + cx^2 + dx + 1$, where Lo is the maximum width: the coefficients a, b, c and d are defined according to the rigidity and bending parameters of the flexible vane: and x is the ratio C/Co, where C is measured along the horizontal axis of the higher bending region measured from the boundary of the fixation end portion and Co is the length of the higher bending region.

2. A suction valve, according to claim 1, wherein the higher bending region extends from the region of the fixation end portion until 50%-60% of the length of the flexible vane.

3. A suction valve, according to claim 1, characterized in that the values of the coefficients a, b, c, and d, are: 1,4946; -4,4452; 5,028; and -2,7254, allowing the geometric shape of the flexible vane 10 to be defined by the variation of the width L along the higher bending region 17 and as a function of the extension C in relation to the boundary line of the fixation end portion 11, according to the equation L/Lo.

* * * * *